(12) United States Patent
Hori et al.

(10) Patent No.: US 6,805,026 B2
(45) Date of Patent: Oct. 19, 2004

(54) AUTOMATIC TRANSMISSION

(75) Inventors: Yoshiaki Hori, Saitama (JP); Seiji Hamaoka, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/401,766

(22) Filed: Mar. 31, 2003

(65) Prior Publication Data
US 2004/0025630 A1 Feb. 12, 2004

(30) Foreign Application Priority Data
Apr. 17, 2002 (JP) ....................................... 2002-114432

(51) Int. Cl.$^7$ .............................................. F16H 47/00
(52) U.S. Cl. ....................................... 74/730.1; 74/330
(58) Field of Search ................................ 74/730.1, 330

(56) References Cited

U.S. PATENT DOCUMENTS 6,484,607 B2 * 11/2002 Shichinohe et al. ....... 74/730.1
2003/0136221 A1 * 7/2003 Hori et al. ................ 74/730.1

FOREIGN PATENT DOCUMENTS

JP            57-2953 B2      1/1982

* cited by examiner

Primary Examiner—Dirk Wright
(74) Attorney, Agent, or Firm—Birch, Stewart, Kolasch & Birch, LLP

(57) ABSTRACT

In an automatic transmission includes a main shaft and a counter shaft which are parallel to a crankshaft with the rotation of a torque converter on the crankshaft being transmitted to the main shaft through gears. A two-state speed change is conducted by gears provided on the main shaft and the counter shaft. An oil hydraulic clutch is operatively provided for connection and disconnection between the gear for reducing the spacing between the crankshaft and the transmission and to contrive a reduction in size of a power unit. A tubular auxiliary main shaft rotatable relative to the main shaft is provided at the outer circumference of the main shaft with a first-speed drive gear and a rearward-running drive gear are fixed on the auxiliary main shaft. First and second oil hydraulic clutches are provided for enabling contact and separation between the main shaft and the auxiliary main shaft.

16 Claims, 5 Drawing Sheets

AUTOMATIC TRANSMISSION

CROSS-REFERENCE TO RELATED APPLICATIONS

The present nonprovisional application claims priority under 35 USC 119 to Japanese Patent Application No. 2002-114432 filed on Apr. 17, 2002 the entire contents thereof is hereby incorporated by reference.

BACKGROUND OF THE INVENTION

1. Field of the Invention

The present invention relates to an automatic transmission for an internal combustion engine-transmission integral type power unit mounted on a four-wheel buggy car (saddle-ride type vehicle for operating on irregular surfaces) or the like.

2. Description of Background Art

Japanese Patent Publication No. Sho 57-2953 discloses a conventional crankshaft of an internal combustion engine and a main shaft of a transmission that are disposed on one straight line. Power is transmitted in a series manner from the crankshaft of the internal combustion engine to a torque converter disposed at an end of the main shaft of the transmission. In addition, oil hydraulic clutches are disposed, respectively, on the main shaft and a counter shaft.

Conventionally, the crankshaft of the internal combustion engine and the main shaft of the transmission have been disposed in series on one straight line, so that the overall length of the power unit is large. This structure is unsuitable for mounting on a four-wheel buggy car or a motorcycle. When the crankshaft and the shaft of the transmission are disposed in parallel to each other in a conventional constitution, for the purpose of obviating the above-mentioned inconvenience and shortening the overall length, the outside diameters of the crankshaft and the clutches will interfere with each other. Therefore, the spacing between the shafts must be enlarged. This approach has a problem in that the power unit becomes large in size and the weight is also increased.

OBJECTS AND SUMMARY OF THE INVENTION

The present invention solves the above-mentioned problems. The present invention is directed to an automatic transmission including a main shaft and a counter shaft which are disposed parallel to a crankshaft. The rotation of a torque converter is provided on the crankshaft being transmitted to the main shaft through bearings. A two-stage speed change is conducted by gears provided on the main shaft and the counter shaft. An oil hydraulic clutch is provided for connection and disconnection between these gears. A tubular auxiliary main shaft is rotatable relative to the main shaft and is provided at the outer circumference of the main shaft. A first-speed drive gear and a rearward-running drive gear are fixed on the auxiliary main shaft. A first oil hydraulic clutch for enabling contact and separation between the main shaft and the auxiliary main shaft is disposed on the outside of one of a pair of support portions for supporting the main shaft. A second oil hydraulic clutch for enabling contact and separation between a second-speed drive gear which is in loose fit on the main shaft and engaged with a second-speed driven gear fixed on the counter shaft and the main shaft is disposed on the outside of the other of the pair of supporting portions for supporting the main shaft.

According to the present invention, the crankshaft and the main shaft are thus parallel to each other, so that the overall length of the power unit can be shortened. In addition, since the oil hydraulic clutches are disposed at end portions on the outside of the front and rear support portions for the main shaft, it is possible to obviate interference among the torque converter, a crank, an AC generator and the like on the crankshaft.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
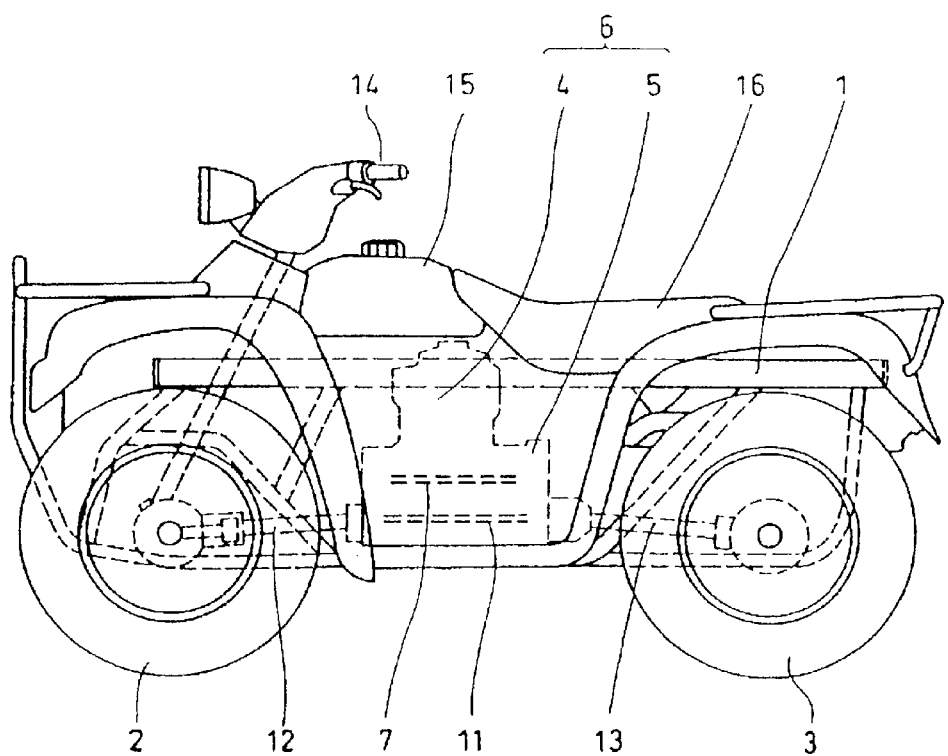
FIG. 1 is a side view of a four-wheel buggy car (saddle-ride type vehicle for operating on irregular surfaces) on which a power unit comprising an automatic transmission according to one embodiment of the invention is mounted.

FIG. 1 is a side view of a four-wheel buggy car (saddle-ride type vehicle for operating on irregular surfaces) on which a power unit comprising an automatic transmission according to one embodiment of the present invention is mounted. The buggy car comprises a pair of front wheels 2 and a pair of rear wheels 3 mounted at front and rear portions of a vehicle body frame 1. A power unit 6 includes an internal combustion engine 4 and a transmission 5 integrated with each other and supported at a central portion of the vehicle body frame 1. The power unit 6 is disposed with a crankshaft 7 directed in the front-rear direction of the vehicle body. The rotation of the crankshaft 7 is transmitted to an output shaft 11 shown in FIG. 1, through a main shaft 8, an intermediate shaft 9 and a counter shaft 10 of a transmission which will be described later. Each of these shafts is parallel to the crankshaft and is disposed in the front-rear direction of the vehicle body. The front wheels 2 are driven by a front wheel drive shaft 12 connected to the front end of the output shaft 11, whereas the rear wheels 3 are driven by a rear wheel drive shaft 13 connected to the rear end of the output shaft 11. A steering handle 14, a fuel tank 15 and a saddle type seat 16 are provided, in this order from the front side, at upper portions of the vehicle body.

Figure 2:
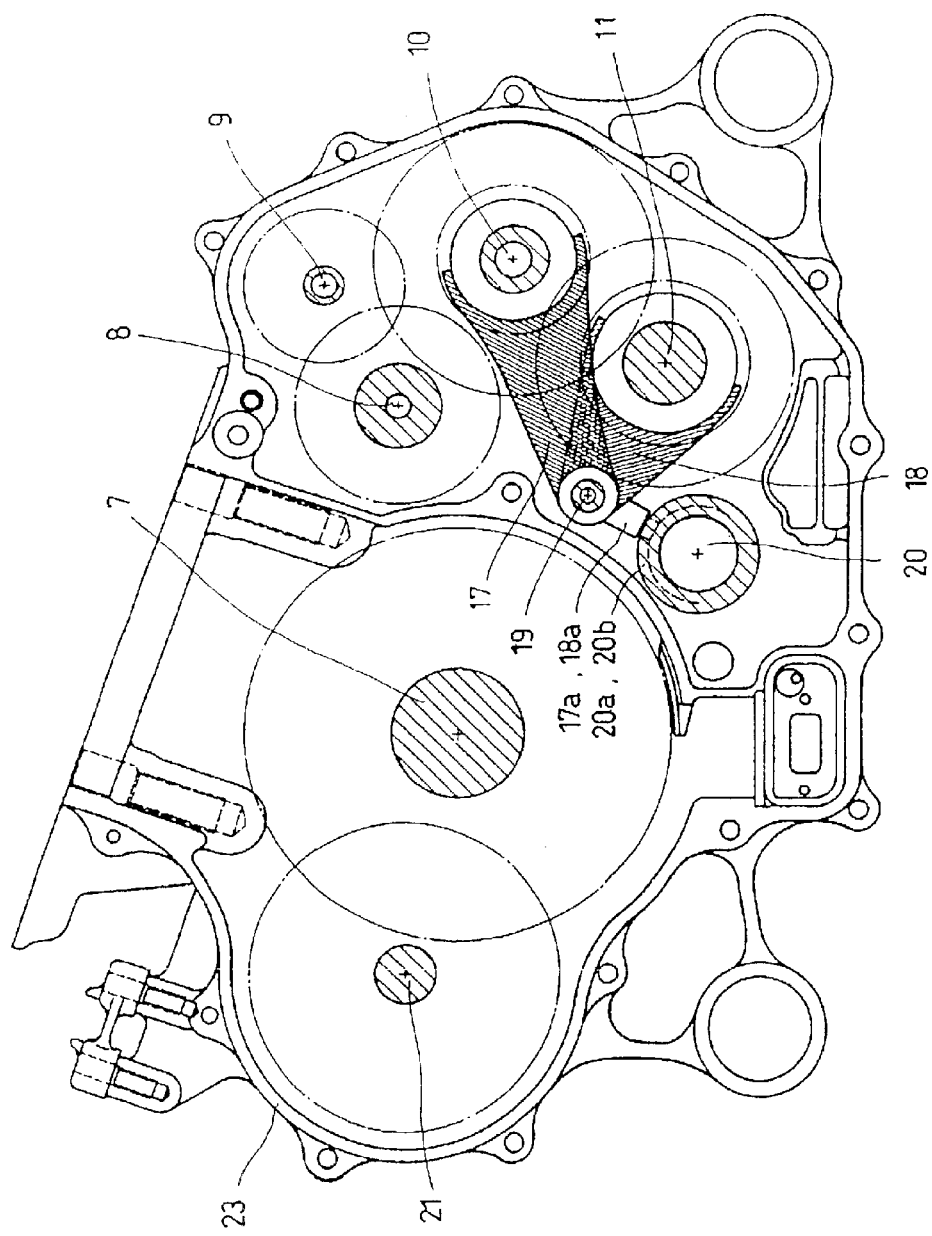
FIG. 2 shows a cross section of a crankcase 23 of the power unit, as viewed from the front side.

FIG. 2 shows a cross section of a crankcase 23 of the power unit, as viewed from the front side. FIG. 2 illustrates the crankshaft 7, the main shaft 8, the intermediate shat 9, the counter shaft 10, and the output shaft 11. In addition, the positions of shift forks 17 and 18, a shift fork guide shaft 19, and a shift drum 20 are shown. A balance weight shaft 21 is provided in the vicinity of the crankshaft 7.

Figure 3:
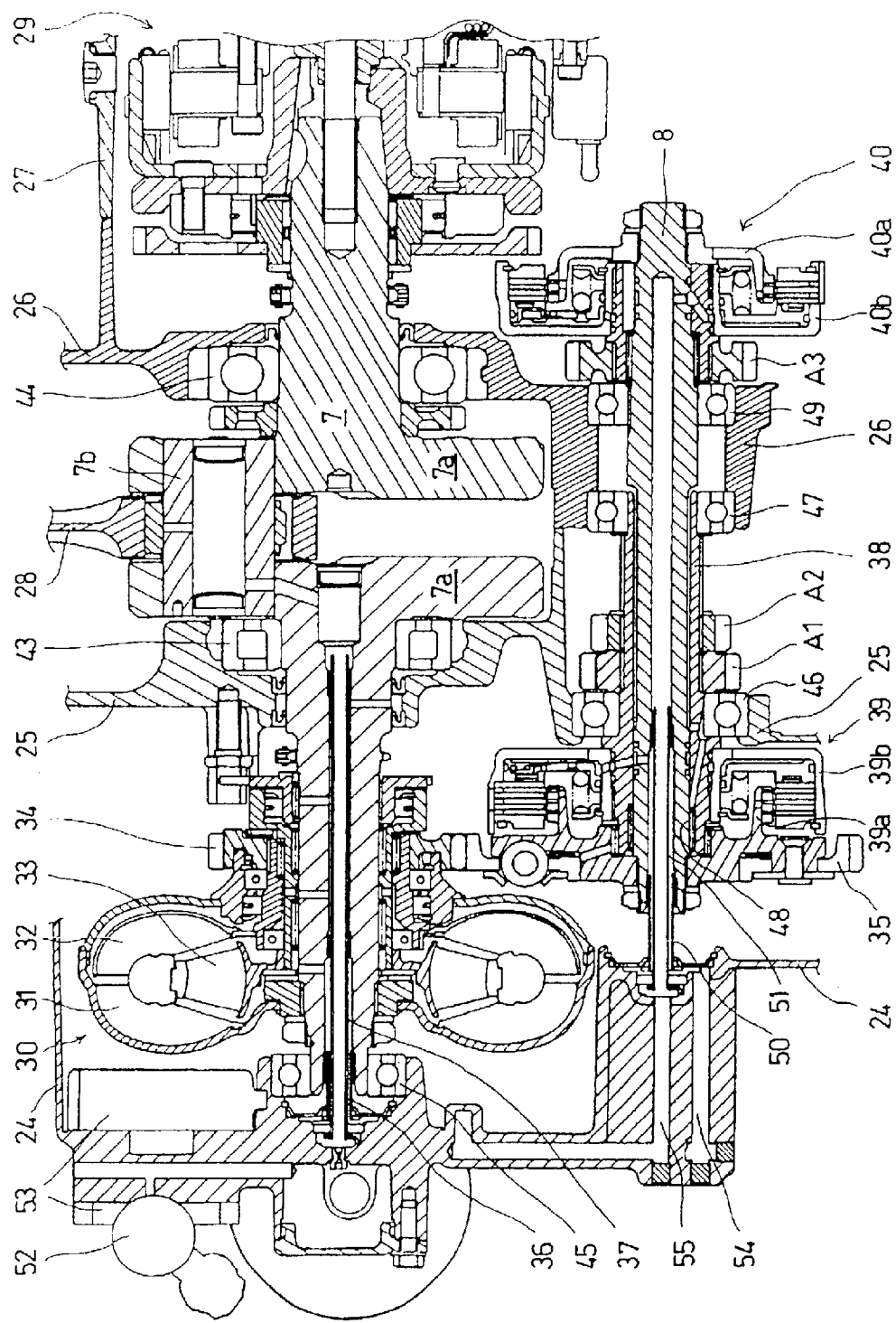
FIG. 3 is a sectional view including a crankshaft 7 and a main shaft 8.
Figure 4:
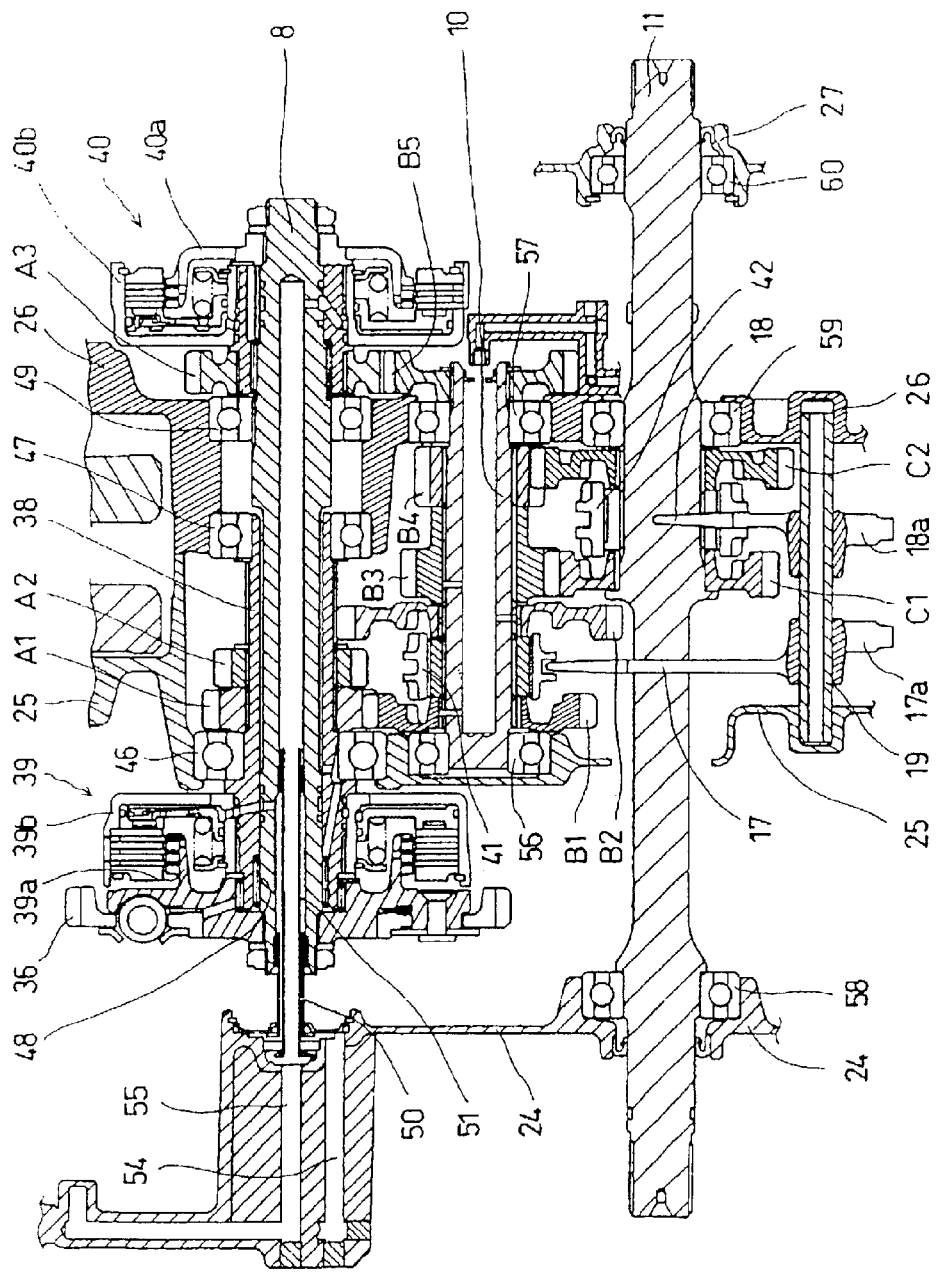
FIG. 4 is a sectional development including the main shaft 8, a counter shaft 10, an output shaft 11 and a shift fork guide shaft 19.
Figure 5:
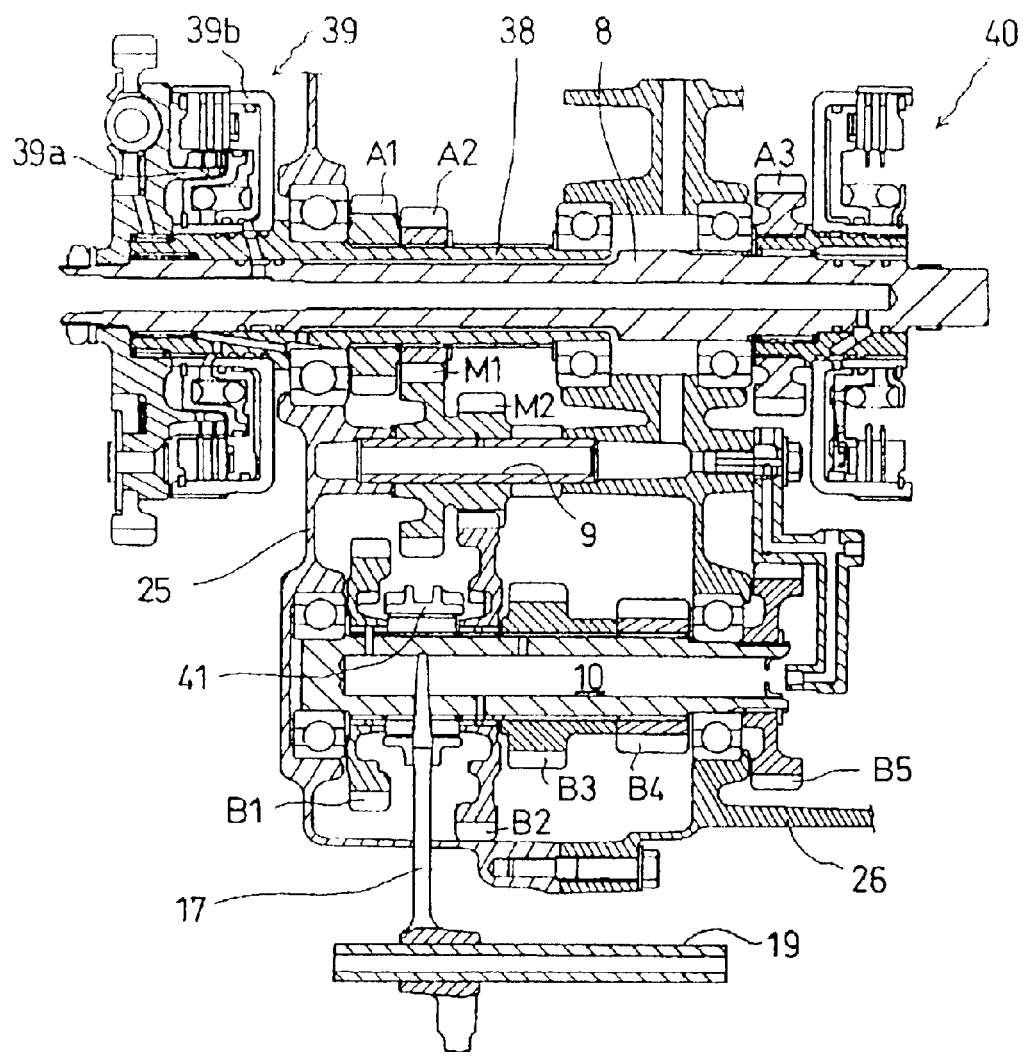
FIG. 5 is a sectional development including the main shaft 8, an intermediate shaft 9, the counter shaft 10 and the shift fork guide shaft 19.

FIG. 3 is a sectional view including the crankshaft 7 and the main shaft 8. FIG. 4 is a sectional development including the main shaft 8, the counter shaft 10, the output shaft 11 and the shift fork guide shaft 19. FIG. 5 is a sectional development including the main shaft 8, the intermediate shaft 9, the counter shaft 10 and the shift fork guide shaft 19. The sectional view and sectional developments including these shafts illustrate a power transmission mechanism, and, particularly, FIGS. 4 and 5 show the parts pertaining to the automatic transmission.

FIG. 3 shows the power transmission mechanism relating to the crankshaft 7 and the main shaft 8. A crankcase portion of the power unit includes a front crankcase cover 24, a front crankcase 25, a rear crankcase 26, and a rear crankcase cover 27, in this order from the front side. The crankshaft 7 is rotatably supported on the crankcases 25 and 26 through bearings 43 and 44. A front extension portion of the crankshaft 7 is supported on the front crankcase cover 24 through a bearing 45. The crankshaft 7 is divided into front and rear portions, which are connected by a crank pin 7b at crank web portions 7a thereof, and a connecting rod 28 is supported by the crank pin 7b. An AC generator 29 for generating electric power by the rotation of the crankshaft 7 is mounted on a rear end portion of the crankshaft 7.

A torque converter 30 is mounted on a front portion of the crankshaft 7, and a primary drive gear 34 is in loose fit on the crankshaft 7 adjacently to the torque converter 30. The torque converter 30 includes a pump impeller 31 fixed to the crankshaft 7, a turbine runner 32 opposed thereto, and a stator 33. The turbine runner 32 is connected to the primary drive gear 34. Working oil for the torque converter 30 is supplied from the front crankcase cover 24 through the gap between an outer pipe 36 and an inner pipe 37 of a double-wall pipe inserted in a central hole of the crankshaft 7. Lubricating oil for the crank pin 7b is supplied through the inside of the inner pipe 37. The double-wall pipe is elastically supported on the front crankcase cover 24 through an O-ring, whereby eccentricity of the axis is absorbed.

A tubular auxiliary main shaft 38 is provided at the outer circumference of a front half of the main shaft 8. The auxiliary main shaft 38 is rotatably supported on the front and rear crankcases 25 and 26 through bearings 46 and 47. The front half of the main shaft 8 penetrates through the central hole of the auxiliary main shaft 38, and is rotatably supported by the auxiliary main shaft 38 through a needle bearing 48. A rear portion of the main shaft 8 is rotatably supported on the rear crankcase 26 through a bearing 49. The main shaft 8 and the auxiliary main shaft 38 are rotatable relative to each other.

A primary driven gear 35, normally meshed with the primary drive gear 34, is fixed to a front portion of the main shaft 8. The rotation of the crankshaft 7 is transmitted through the torque converter 30 to the primary drive gear 34, is further transmitted to the primary driven gear 35 meshed with the primary drive gear 34, and is transmitted to the main shaft 8 through a primary speed reduction by these gears. The main shaft 8 is normally rotated during operation of the internal combustion engine.

A first-speed oil hydraulic type multiple disk clutch 39 is provided on the front side of the bearing 46, at the front end of the auxiliary main shaft 38. A first-speed drive gear A1 and a rearward-running drive gear A2 are fixed on the auxiliary main shaft 38, on the rear side of the bearing 46. An inner 39a of the first-speed oil hydraulic type multiple disk clutch 39 is integral with the primary driven gear 35 fixed on the main shaft 8. An outer 39b of the clutch 39 is fixed on the auxiliary main shaft 38. When the first-speed oil hydraulic type multiple disk clutch 39 is connected by oil hydraulic pressure, the main shaft 8 and the auxiliary main shaft 38 are connected to each other through the primary driven gear 35 and the first-speed oil hydraulic type multiple disk clutch 39. The rotation of the main shaft 8 is transmitted to the first-speed drive gear A1 and the rearward-running drive gear A2 on the auxiliary main shaft 38.

A second-speed drive gear A3 larger than the first-speed drive gear A1 in diameter is in loose fit on a rear end portion of the main shaft 8, on the rear side of the bearing 49, and a second-speed oil hydraulic type multiple disk clutch 40 is provided adjacently to the second-speed drive gear A3. Of the second-speed oil hydraulic type multiple disk clutch 40, an inner 40a is fixed onto the main shaft 8, and an outer 40b is so connected so that it can be rotated as one body with the second-speed drive gear A3. When the second-speed oil hydraulic type multiple disk clutch 40 is connected by an oil hydraulic pressure, the rotation of the main shaft 8 is transmitted to the second-speed drive gear A3.

In connecting the first-speed and second-speed clutches, hydraulic oil is supplied only to either one of the clutches for effecting the connection. Working oil for the first-speed oil hydraulic type multiple disk clutch 39 is supplied through the gap between an outer pipe 50 and an inner pipe 51 of a double-wall pipe inserted from the front crankcase cover 24 into the central hole of the main shaft 8. Working oil for the second-speed oil hydraulic type multiple disk clutch 40 is supplied through the inner pipe 51 of the double-wall pipe. The changeover of the destination of the hydraulic oil is carried out through a changeover of an oil passage inside a valve body 53 by passing an electric current to a solenoid valve 52, whereby oil passages 54 and 55 inside the front crankcase cover 24 connected to the double-wall pipe are changed over. The current-passing operation for this changeover is automatically conducted by an instruction signal from an electronic controller based on parameters such as vehicle speed, throttle opening, etc. The double-wall pipe is elastically supported on the front crankcase cover 24 through an O-ring, whereby eccentricity of the axis is absorbed.

FIG. 4 shows the power transmission mechanism for transmitting power from the main shaft 8 to the counter shaft 10 and the output shaft 11. The counter shaft 10 is rotatably supported on the front and rear crankcases 25 and 26 through bearings 56 and 57, whereas the output shaft 11 is rotatably supported on the front crankcase cover 24, the rear crankcase 26 and the rear crankcase cover 27 through bearings 58, 59 and 60.

A first-speed driven gear B1 and a rearward-running driven gear B2 are in loose fit on the counter shaft 10 with a forward/rearward selection dog clutch 41 being provided therebetween. Either one of the gears B1 and B2 can be fixed to the counter shaft 10 by a selecting operation of the shift fork 17. Further, a high drive gear B3, a low drive gear B4 and a second-speed driven gear B5 are fixed on the counter shaft 10. The high drive gear B3 is larger than the low drive gear B4 in diameter.

A high driven gear C1 and a low driven gear C2 are in loose fit on the output shaft 11 with a high/low selection dog clutch 42 being provided therebetween. Either one of the gears C1 and C2 can be fixed to the output shaft by a selecting operation of the shift fork 18. Shift forks 17 and 18 are both supported by the guide shaft 19. Tip ends of shifter pins 17a and 18a provided in the shift forks 17 and 18 are inserted in cam grooves 20a and 20b which are provided, as grooves for exclusive use for the respective pins, in the shift drum 20 shown in FIG. 2. Turning of the shift drum 20 is manually effected by the rider, through an operation cable (not shown) connected to a shift lever (not shown) provided at the steering handle 14 of the vehicle.

The first-speed driven gear B1 is in loose fit on the counter shaft 10 and is normally meshed with the first-speed drive gear A1 on the auxiliary main shaft 38. The rearward-running driven gear B2 is in loose fit on the counter shaft 10 and is normally meshed with the rearward-running drive gear A2 through a direction changeover gears M1 and M2 which will be described later. The high drive gear B3 and the low drive gear B4 fixed on the counter shaft 10 are normally meshed, respectively, with the high driven gear C1 and the low driven gear C2 which are in loose fit on the output shaft 11. The second-speed driven gear B5 is normally meshed with the second-speed drive gear A3 on the main shaft 8.

FIG. 5 shows the power transmission mechanism for transmitting power from the main shaft 8 to the counter shaft 10 through the intermediate shaft 9. The intermediate shaft 9 is supported on the front and rear crankcases 25 and 26. The direction changeover gears M1 and M2 are rotatably supported on the intermediate shaft 9. The direction changeover gears M1 and M2 are idle gears which have a common boss portion. The gear M2 is smaller than the gear M1 in diameter. The direction changeover gear M1 is normally meshed with the rearward-running drive gear A2 fixed on the auxiliary main shaft 38, whereas the direction changeover gear M2 is normally meshed with the rearward-running driven gear B2 on the counter shaft 10.

The automatic transmission according to the present embodiment is constituted as described above. In describing the speed change functions of the automatic transmission, for convenience of description, selection of the first-speed clutch of the first-speed and second-speed oil hydraulic type multiple disk clutches 39 and 40 will be designated as "first speed," selection of the second-speed clutch will be designated as "second speed," selection of the first-speed driven gear B1 side of the forward/rearward selection dog clutch 41 will be designated as "forward," selection of the rearward-running driven gear B2 will be designated as "rearward," selection of the high driven gear C1 side of the high/low selection dog clutch 42 will be designated as "high gear," and selection of the low driven gear C2 side will be designated as "low gear."

There are six choices for combinations of the oil hydraulic type clutch and the dog clutch, which can be arranged in the order of increasing vehicle speed as follows. For the individual choices, the gear trains to be operated will also be shown.

In the case of forward running:
 (a) First speed-Forward-Low gear: A1-B1-B4-C2,
 (b) First speed-Forward-High gear: A1-B1-B3-C1,
 (c) Second speed-Low gear: A3-B5-B4-C2,
 (d) Second speed-High gear: A3-B5-B3-C1,
In the case of rearward running:
 (a) First speed-Rearward-Low gear: A2-M1-M2-B2-B4-C2,
 (b) First speed-Rearward-High gear: A2-M1-M2-B2-B3-C1.

As has been described in detail above, the automatic transmission according to the present invention has a structure in which the crankshaft 7 and the main shaft 8 are parallel to each other, so that the overall length of the power unit can be shortened. In addition, since the oil hydraulic clutches 39 and 40 are disposed at end portions on the outside of the front and rear support portions (the bearing 46 and the bearing 49) for the main shaft, interference of the oil hydraulic clutches 39 and 40 with the torque converter 30, the crank 7a and 7b, the AC generator 29 and the like on the crankshaft 7 can be obviated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An automatic transmission comprising:
 a main shaft and a counter shaft being disposed parallel to a crankshaft;
 a torque converter operatively provided on said crankshaft for rotation that is transmitted to said main shaft through gears with a two-stage speed change being conducted by gears provided on said main shaft and said counter shaft;
 an oil hydraulic clutch is operatively provided for connection and disconnection between the gears;
 a tubular auxiliary main shaft is rotatable relative to said main shaft and is provided at the outer circumference of said main shaft;
 a first-speed drive gear and a rearward-running drive gear are fixed on the auxiliary main shaft;
 a first oil hydraulic clutch for enabling contact and separation between said main shaft and said auxiliary main shaft is disposed on an outside of one of a pair of support portions for supporting said main shaft; and
 a second oil hydraulic clutch for enabling contact and separation between a second-speed drive gear in loose fit on said main shaft and being engaged with a second-speed driven gear fixed on said counter shaft and said main shaft is disposed on an outside of the other of said pair of support portions for supporting said main shaft.

2. The automatic transmission according to claim 1, wherein said torque converter is disposed adjacent to a forward portion of said crankshaft.

3. The automatic transmission according to claim 1, wherein said torque converter includes a pump impeller fixed to the crankshaft, a turbine runner opposed thereto and a stator.

4. The automatic transmission according to claim 1, wherein the tubular auxiliary main shaft is supported for rotation on a forward and rearward portion of the crankcase by bearings with the main shaft projecting through an opening in the auxiliary main shaft, said main shaft being rotatably supported within said auxiliary main shaft by a bearing.

5. The automatic transmission according to claim 1, wherein said first oil hydraulic clutch includes an inner member integral with a primary driven gear fixed on the main shaft.

6. The automatic transmission according to claim 5, wherein said first oil hydraulic clutch includes an outer member fixed on the auxiliary main shaft wherein when the first oil hydraulic clutch is connected by oil hydraulic pressure, the main shaft and the auxiliary main shaft are connected to each other through a driven gear and the first hydraulic clutch.

7. The automatic transmission according to claim 1, wherein said second oil hydraulic clutch includes an inner member fixed on the main shaft.

8. The automatic transmission according to claim 7, wherein said second oil hydraulic clutch includes an outer member rotatably as one body with the second-speed drive gear wherein when the second oil hydraulic clutch is connected by oil hydraulic pressure, the rotation of the main shaft is transmitted to the second-speed drive gear.

9. An automatic transmission comprising:
- a main shaft and a counter shaft being disposed substantially in parallel to a crankshaft;
- a torque converter operatively provided on said crankshaft for rotation that is transmitted to said main shaft through gears with a two-stage speed change being conducted by gears provided on said main shaft and said counter shaft;
- a tubular auxiliary main shaft is rotatable relative to said main shaft and is provided at the outer circumference of said main shaft;
- a first oil hydraulic clutch for enabling contact and separation between said main shaft and said auxiliary main shaft is disposed on an outside of one of a pair of support portions for supporting said main shaft; and
- a second oil hydraulic clutch for enabling contact and separation between a second-speed drive gear in loose fit on said main shaft and being engaged with a second-speed driven gear fixed on said counter shaft and said main shaft is disposed on an outside of the other of said pair of support portions for supporting said main shaft.

10. The automatic transmission according to claim 9, wherein said torque converter is disposed adjacent to a forward portion of said crankshaft.

11. The automatic transmission according to claim 9, wherein said torque converter includes a pump impeller fixed to the crankshaft, a turbine runner opposed thereto and a stator.

12. The automatic transmission according to claim 9, wherein the tubular auxiliary main shaft is supported for rotation on a forward and rearward portion of the crankcase by bearings with the main shaft projecting through an opening in the auxiliary main shaft, said main shaft being rotatably supported within said auxiliary main shaft by a bearing.

13. The automatic transmission according to claim 9, wherein said first oil hydraulic clutch includes an inner member integral with a primary driven gear fixed on the main shaft.

14. The automatic transmission according to claim 13, wherein said first oil hydraulic clutch includes an outer member fixed on the auxiliary main shaft wherein when the first oil hydraulic clutch is connected by oil hydraulic pressure, the main shaft and the auxiliary main shaft are connected to each other through a driven gear and the first hydraulic clutch.

15. The automatic transmission according to claim 9, wherein said second oil hydraulic clutch includes an inner member fixed on the main shaft.

16. The automatic transmission according to claim 15, wherein said second oil hydraulic clutch includes an outer member rotatably as one body with the second-speed drive gear wherein when the second oil hydraulic clutch is connected by oil hydraulic pressure, the rotation of the main shaft is transmitted to the second-speed drive gear.

* * * * *